W. J. ALLEN.

Condenser for Engines.

No. 8,188. Reissued April 23, 1878.

Attest;

Geo. H. Graham.

David Wm. DeForest

Inventor,

William J. Allen, by Munson & Philipp,

Attorneys.

UNITED STATES PATENT OFFICE.

WILLIAM J. ALLEN, OF BUFFALO, NEW YORK.

IMPROVEMENT IN CONDENSERS FOR ENGINES.

Specification forming part of Letters Patent No. 193,589, dated July 31, 1877; Reissue No. 8,188, dated April 23, 1878; application filed April 1, 1878.

*To all whom it may concern:*

Be it known that I, WILLIAM JOHN ALLEN, of the city of Buffalo, county of Erie, and State of New York, have invented certain new and useful Improvements in Condensers for Engines, Vacuum-Pans, &c., of which the following is a specification:

It is the object of this invention to so improve the construction of condensers for engines and vacuum-pans that a more perfect vacuum shall be produced than is attainable by siphon and other condensers now in common use, upon which the present invention is an improvement.

The invention consists, primarily, in providing the condenser-head with an air-pipe, extending to a proper height within the same, with which air-pipe a water-pipe, communicating with the interior of the condenser-head, is so combined that the water it conveys shall be discharged into the air-pipe at a point below its induction-orifice, whereby the air in the condenser-head is caused to flow through said air-pipe, and an improved vacuum is obtained.

The invention also includes the arrangement of a plurality of such air and water pipes, and combinations of them with other parts of the apparatus, all of which will be particularly hereinafter described.

Figure 1:
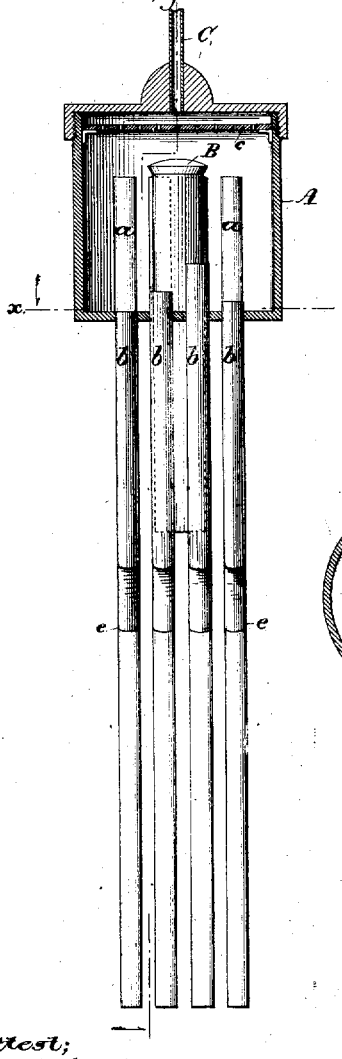
Figure 2:
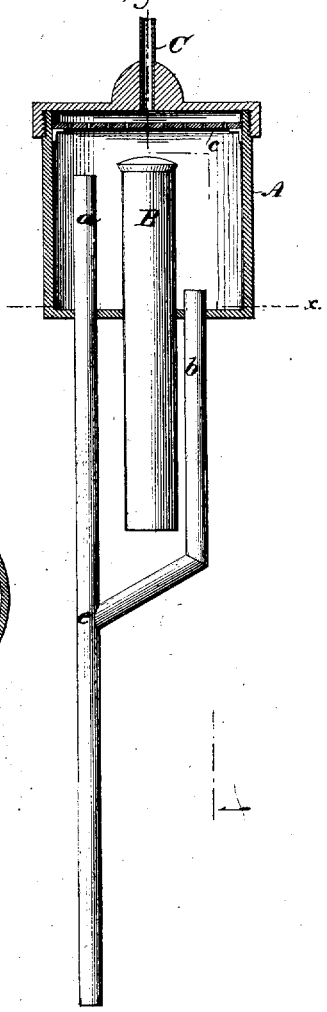
Figure 3:
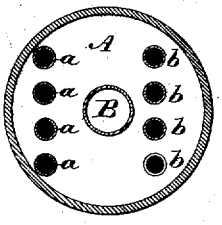

One embodiment of this invention is shown in the accompanying drawing, wherein Figure 1 shows the condenser-head in section and other parts in elevation. Fig. 2 is a similar view, taken at right angles to Fig. 1; and Fig. 3 is a sectional plan view on the lines *x x* of Figs. 1 and 2.

A represents the ordinary condenser-head, with the interior of which the induction-pipe B, leading from the engine or vacuum-pan, communicates. The usual water-induction pipe C is connected by a joint to the top plate of the condenser-head, so as to communicate with the interior thereof. The condenser-head is also supplied with the usual perforated spreading-plate *c*.

The air-pipes *a*, (see Fig. 2,) of which there may be any number, extend through the bottom plate into the condenser-head, and each of the water-pipes *b*, which will correspond in number with the said air-pipes, communicates with the interior of the condenser-head through its bottom plate, and has its eduction-orifice in one of said air-pipes, at a point thereof which is below the bottom of the condenser-head, and consequently below the induction-orifice of said air-pipe.

The water-pipes *b* are shown to extend to unequal heights in the condenser-head, and their induction-orifices are consequently so related to each other that a greater or less flow of water is obtained, according to the quantity of it present in the condenser-head, a regular and even flow of it results, and its static force is varied in the several pipes, whereby an advantageous combined action of them is obtained.

The water-pipes *b* are also shown as bent at an obtuse angle at their lower ends, which construction causes them to conduct their contents into the air-pipes *d* without an abrupt change in the direction of its flow, whereby its velocity is not impeded. This may be effected by curving the pipe *b*, or leading it more or less directly into the pipe *a*.

When this apparatus is in operation, the water introduced through the pipe C, being spread by the perforated plate *c*, rises in the condenser-head until its height is such as to cause it to enter, according to its volume, into one or more of the pipes *b*, through which it flows into the air-pipes *a*, causing a suction of air therein at the eduction-points *e* of the pipes *b*, and above them in the pipes *a*, thereby causing the air or steam contained in the condenser-head to be exhausted through said pipes *a*, and a vacuum to be formed in said condenser-head.

It is obvious that, if the condenser-head be lengthened and the pipes *b* shortened, the same effect will be obtained, that being a matter of construction only; and also that the construction of the pipes *b* and *a*, and the mode of connecting the one with the other, may be changed without departing from the gist or spirit of my invention, so long as each water-pipe *a* communicates with its companion air-pipe *b*, and the eduction of the water it conducts is made into the air-pipe *a* at a point far enough below the induction-orifice of said air-pipe to produce the requisite suction therein.

One of the many advantages of my improvement is that a less quantity of water will draw off a greater quantity of air than by any of the devices now in use.

What is claimed is—

1. The combination, with a condenser-head, of an air-pipe, *a*, and a water-pipe, *b*, the said air and water pipes being so arranged that the latter will discharge into the former below its induction-orifice, substantially as described.

2. The combination, with the condenser-head, of a plurality of water-pipes, *a*, and air-pipes *b*, which pipes are arranged in pairs, so that a water-pipe discharges into an air-pipe, and said water-pipes have their induction-orifices arranged at different heights, substantially as described.

3. The combination, with the condenser-head, of the pipe B, water-pipe C, air-pipes *a*, and the water-pipes *b*, the latter leading from the condenser-head into the pipes *a*, whereby a greater velocity of water and suction of air are obtained where the air and water meet, substantially as described.

In testimony whereof I have hereunto set my hand in the presence of two subscribing witnesses.

WILLIAM JOHN ALLEN. [L. S.]

Witnesses:
T. A. JEBB,
F. M. INGLEHAUT.